US011084538B2

(12) United States Patent
Kielbik et al.

(10) Patent No.: US 11,084,538 B2
(45) Date of Patent: Aug. 10, 2021

(54) MULTI-FLANGE EXTRUSION MEMBER

(71) Applicant: GM GLOBAL TECHNOLOGY OPERATIONS LLC, Detroit, MI (US)

(72) Inventors: Robert M. Kielbik, Chesterfield Township, MI (US); Robert N. Saje, Shelby Township, MI (US); John J. Jackson, Chesterfield Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 152 days.

(21) Appl. No.: 16/422,230

(22) Filed: May 24, 2019

(65) Prior Publication Data
US 2020/0369325 A1 Nov. 26, 2020

(51) Int. Cl.
*B62D 27/02* (2006.01)
*B62D 25/20* (2006.01)

(52) U.S. Cl.
CPC ....... *B62D 27/023* (2013.01); *B62D 25/2009* (2013.01)

(58) Field of Classification Search
CPC ............ B62D 25/2009; B62D 25/2036; B62D 27/023; B62D 25/02; B62D 25/04
USPC ......................................................... 296/29
See application file for complete search history.

(56) References Cited

U.S. PATENT DOCUMENTS

| 5,094,504 A * | 3/1992 | Wurl .................... B62D 25/025 296/202 |
| 10,766,540 B2 * | 9/2020 | Sono ...................... B62D 21/15 |
| 2005/0264042 A1 * | 12/2005 | Abe ...................... B62D 25/025 296/203.01 |
| 2011/0175399 A1 * | 7/2011 | Nakano ................ B62D 25/025 296/193.05 |
| 2014/0327271 A1 * | 11/2014 | Kishima ............. B60R 16/0215 296/193.07 |
| 2014/0333092 A1 * | 11/2014 | Mori .................... B62D 25/025 296/187.09 |
| 2015/0001882 A1 * | 1/2015 | Saje ....................... B62D 21/03 296/187.12 |
| 2016/0194034 A1 * | 7/2016 | Emura ................... B62D 25/04 296/209 |
| 2019/0009836 A1 * | 1/2019 | Stein .................... B62D 27/023 |
| 2019/0152529 A1 * | 5/2019 | Otoguro .............. B62D 29/007 |
| 2019/0193135 A1 * | 6/2019 | Maeda ................. B21D 39/206 |

(Continued)

FOREIGN PATENT DOCUMENTS

JP 04039171 * 2/1992
JP 2018127225 * 8/2018 ............. B62D 25/04
SE WO92/07748 * 5/1992 ............. B62D 27/02

*Primary Examiner* — Jason S Morrow
*Assistant Examiner* — Kevin P Weldon
(74) *Attorney, Agent, or Firm* — Quinn IP Law

(57) ABSTRACT

A connection member includes a first side and a second side opposite the first side. The connection member also includes a third side connecting the first and second sides, the third side including a first portion, a second portion, and a third portion, a first edge separating the first portion from the second portion and a second edge separating the second portion from the third portion. A first flange extends along the first edge and a second flange extends along the second edge such that the first and second flanges are separated by the second portion.

19 Claims, 2 Drawing Sheets

(56) References Cited

U.S. PATENT DOCUMENTS

2020/0298915 A1\* 9/2020 Shimasaki ............. B62D 25/04
2021/0086836 A1\* 3/2021 Muraoka ................... B60J 5/00

\* cited by examiner

MULTI-FLANGE EXTRUSION MEMBER

INTRODUCTION

The present disclosure relates generally to a multi-flange tubular connection member for coupling two or more parts together.

Typically, an extruded member for connecting two components includes flanges specific to the components to be coupled. Significant cost savings could be realized with a coupling member having multiple flanges that may be configured for multiple part coupling scenarios.

SUMMARY

Embodiments according to the present disclosure provide a number of advantages. For example, embodiments according to the present disclosure enable a customizable connection between a plurality of components. The integrated flanges of a connection member may be machined to the desired length and position to enable coupling of a plurality of components, such as vehicle body components.

In an exemplary embodiment of the disclosure, a system for coupling multiple components includes a generally tubular connection member defining a longitudinal axis, the connection member having a first side, a second side opposite the first side, a third side connecting the first and second sides, and a fourth side connecting the first and second sides. The third side includes a first portion defining a first plane, a second portion defining a second plane, and a third portion defining a third plane. The third side also includes a first edge and a second edge. A first flange extends from the first edge and a second flange extends from the second edge. The first edge is separated from the first side by the first portion, the second edge is separated from the second side by the third portion, and the first edge is separated from the second edge by the second portion. The fourth side is separated from the third side by the first and second sides.

In some embodiments, the first flange includes a first flange portion and a second flange portion separated by a first gap.

In some embodiments, the second flange includes a third flange portion and a fourth flange portion separated by a second gap.

In some embodiments, a lateral axis of the connection member passes through the first and second sides and the first flange and the second flange are parallel to the longitudinal axis and laterally spaced from one another.

In some embodiments, the second portion separates the first flange from the second flange.

In some embodiments, the first portion forms a first angle with the first flange and the third portion forms a second angle with the second flange and the first and second angles are different.

In some embodiments, the connection member further includes a support member connecting an interior surface of the first side with an interior surface of the second side.

In an exemplary embodiment of the disclosure, a tubular member includes a first side, a second side opposite the first side, and a third side connecting the first and second sides. The third side includes a first portion defining a first plane, a second portion defining a second plane, and a third portion defining a third plane. The third side also includes a first edge separating the first plane from the second plane and a second edge separating the second plane from the third plane. A first flange extends along the first edge and a second flange extends along the second edge such that the first and second flanges are separated by the second portion. The first, second, and third planes are non-coplanar.

In some embodiments, the first flange includes a first flange portion and a second flange portion separated by a first gap.

In some embodiments, the second flange includes a third flange portion and a fourth flange portion separated by a second gap.

In some embodiments, the tubular member defines a longitudinal axis and the first flange and the second flange are parallel to the longitudinal axis.

In some embodiments, the first portion forms a first angle with the first flange and the third portion forms a second angle with the second flange and the first and second angles are different.

In some embodiments, the tubular member further includes a support member connecting an interior surface of the first side with an interior surface of the second side.

In an exemplary embodiment of the disclosure, a method for coupling vehicle body components includes providing a tubular connection member, the connection member defining a longitudinal axis and having a first side, a second side opposite the first side, a third side connecting the first and second sides, and a fourth side connecting the first and second sides. The third side includes a first portion defining a first plane, a second portion defining a second plane, and a third portion defining a third plane. The third side also includes a first edge and a second edge, the first edge separating the first plane from the second plane and the second edge separating the second plane from the third plane. The connection member also includes a first flange extending from the first edge and a second flange extending from the second edge. The method further includes providing a first vehicle body component and coupling the first vehicle body component to the first flange and providing a second vehicle body component and coupling the second vehicle body component to the second flange such that the first and second vehicle body components are laterally spaced from each other.

In some embodiments, the first flange includes a first flange portion and a second flange portion separated by a first gap and the method includes coupling the first vehicle body component to the first flange portion, providing a third vehicle body component, and coupling the third vehicle body component to the second flange portion such that the first and third vehicle body components are longitudinally spaced from each other.

BRIEF DESCRIPTION OF THE DRAWINGS

The present disclosure will be described in conjunction with the following figures, wherein like numerals denote like elements.

Figure 1:
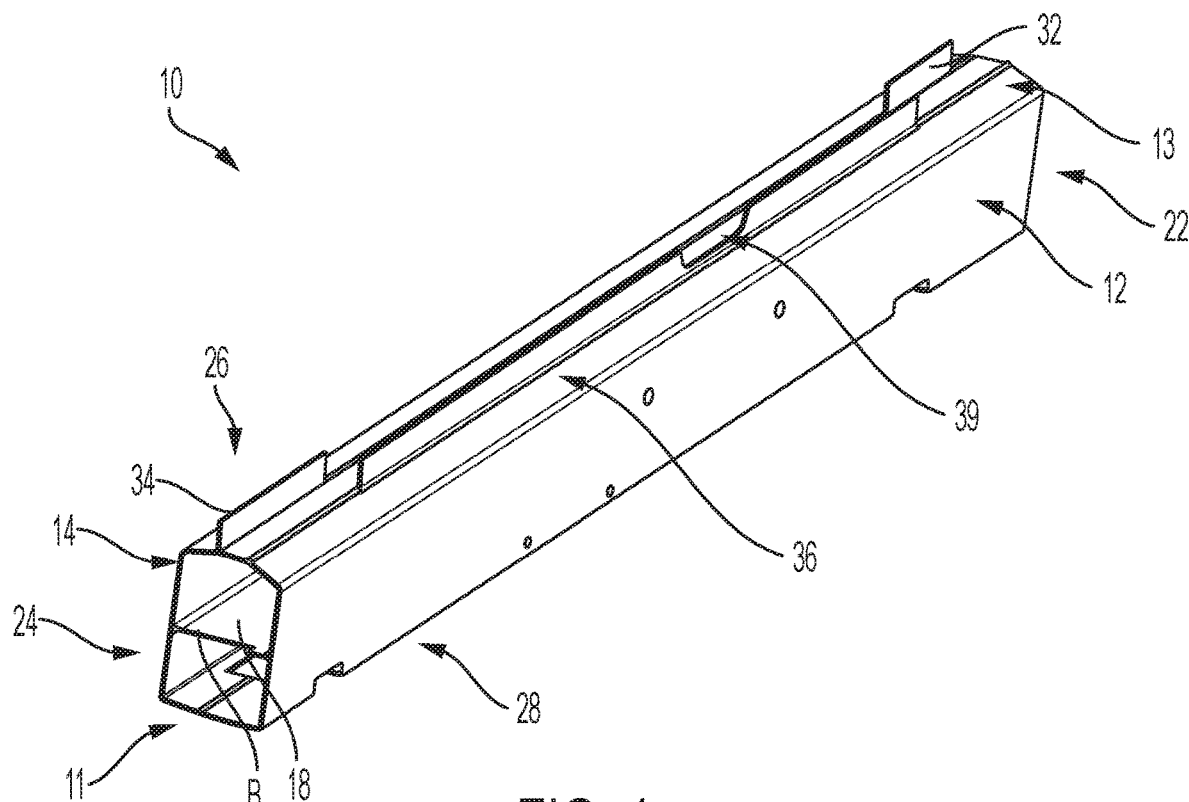
FIG. 1 is a schematic diagram of a perspective view of a connection member having multiple extruded flanges, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Figure 2:
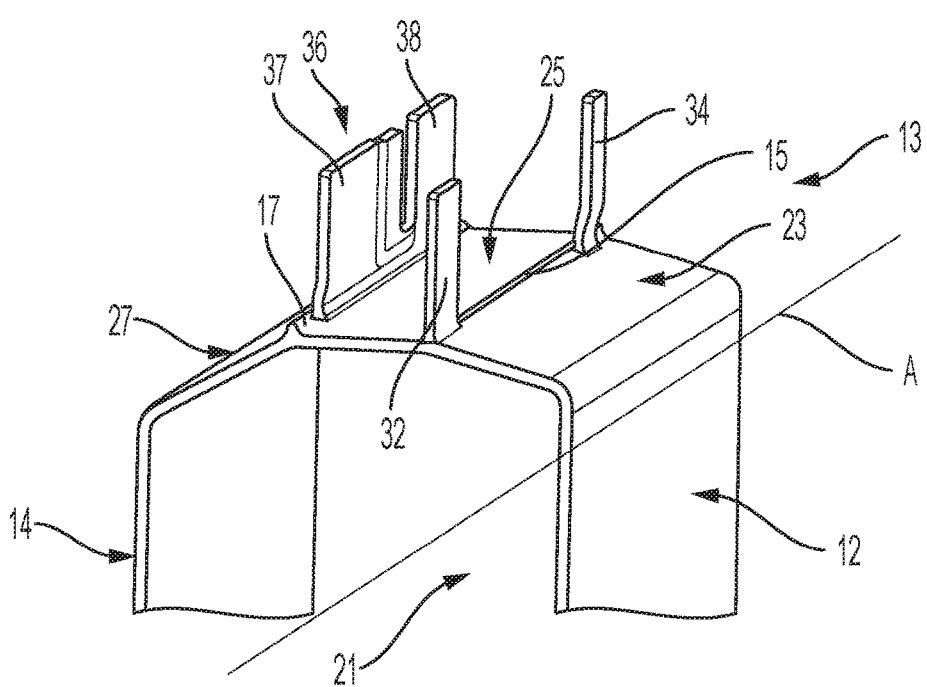
FIG. 2 is a close-up perspective view of the extruded flanges of the connection member of FIG. 1, according to an embodiment.

Referring to FIGS. 1 and 2, a connection member 10 is schematically illustrated. In various embodiments, the connection member 10 is a generally tubular, hollow member having a longitudinal axis A. The connection member 10 is used to couple multiple components, such as vehicle body components in a vehicle body assembly. The connection member 10 has a first end 22 and a second end 24 opposite the first end 22. The connection member 10 also has a top 26 and an underside or bottom 28. The connection member 10 includes a first side 12, a second side 14 opposite and approximately parallel to the first side, and a third side 13 adjacent to each of the first and second sides 12, 14 and connecting the first and second sides 12, 14. A fourth side 11 extends the length of the connection member 10 from the first end 22 to the second end 24 and is adjacent to and connects the first and second sides 12, 14. The fourth side 11 is separated from the third side 13 by the first and second sides 12, 14. In various embodiments, the fourth side 11 includes one or more cutouts or connection points to couple the connection member 10 to a vehicle chassis component, for example and without limitation.

The first, second, third, and fourth sides 12, 14, 13, 11 define an interior space 21 of the connection member 10. In various embodiments, a support member 18 extends through at least a portion of the interior space 21. The support member 18 is adjacent to and connects the first and second sides 12, 14, as best shown in FIG. 1. In various embodiments, the support member 18 is approximately parallel to the fourth side 11. The support member 18 provides rigidity and support to the connection member 10. In various embodiments, the support member 18 extends along a lateral axis B of the connection member 10 such that the lateral axis B passes through each of the first and second sides 12, 14.

In various embodiments, the third side 13 includes a plurality of adjacent surfaces connected by edge members. Each of the plurality of adjacent surfaces defines a plane and each plane is oriented at a different angle (that is, each plane is non-coplanar) depending on the intended connection between the connection member 10 and the coupled component. As shown in FIG. 2, the third side 13 includes a first portion 23 defining a first plane, a second portion 25 defining a second plane, and a third portion 27 defining a third plane. The first, second, and third planes are non-coplanar. A first edge 15 separates the first portion 23 from the second portion 25 and a second edge 17 separates the second portion 25 from the third portion 27. A plurality of flanges extends from each of the first and second edges 15, 17 to enable connection of multiple components using the connection member 10.

In the exemplary embodiment shown in FIGS. 1 and 2, a first flange 32 extends from the first edge 15 at the first end 22 of the connection member 10. A second flange 34 also extends from the first edge 15 at the second end 24 of the connection member 10. A third flange 36 extends from the second edge 17 of the connection member 10. The first, second, and third flanges 32, 34, 36 are arranged to allow connection with multiple other components. In various embodiments, one or more portions of one or more of the flanges may be cut away or removed where not needed for coupling to other components. The third flange 36 includes a first portion 37 and a second portion 38 defining a gap 39. The first, second, and third flanges 32, 34, 36 extend longitudinally along the connection member 10 parallel to the longitudinal axis A.

In various embodiments, including the embodiment shown in FIGS. 1 and 2, the first portion 23 slopes away from the first flange 32 at a first angle and the third portion 27 slopes away from the third flange 36 at a second angle. The angle of slope of the first portion 23 may be the same as or different from the angle of slope of the third portion 27. The angle of slope of each of the first and third portions 23, 27 is determined based on the intended components to be coupled using the connection member 10 such that the shape of the connection member 10 does not impede the connection between the intended components and the one or more of the flanges of the connection member 10.

In various embodiments, the connection member 10 is extruded with multiple flanges that run the length of the connection member 10, that is, a first flange extends along at least a portion of the length of the connection member 10 and a second flange extends along at least a portion of the length of the connection member 10. In various embodiments, the first flange extends along the first edge 15 and the second flange extends along the second edge 17. The flanges can be machined or cut away to the desired configuration based on the intended components to be coupled together. Thus, the connection member 10 with multiple flanges can be customized through machining to obtain the desired configuration, length, and number of flanges.

As best shown in FIG. 1, the flanges 32, 34 do not extend the full length of the connection member 10. Furthermore, in some embodiments, the flanges 32, 34, 36 do not overlap, that is, the flanges extending along one edge do not overlap with flanges on the other edge. However, in other configurations, one or more flanges along one edge may overlap with one or more flanges along the other edge. In various embodiments, the one or more flanges extending from the first edge 15 are "inner" flanges configured to mate with components arranged inward of the connection member 10. In various embodiments, the one or more flanges extending from the second edge 17 are "outer" flanges configured to mate with outboard components including structural components such as a B-pillar of a vehicle body assembly. However, it should be understood that the terms "inner" and "outer" are used to generally indicate a direction and the connection member 10 may be manufactured with any number of and position of flanges to facilitate the mating of one or more components.

Figure 3:
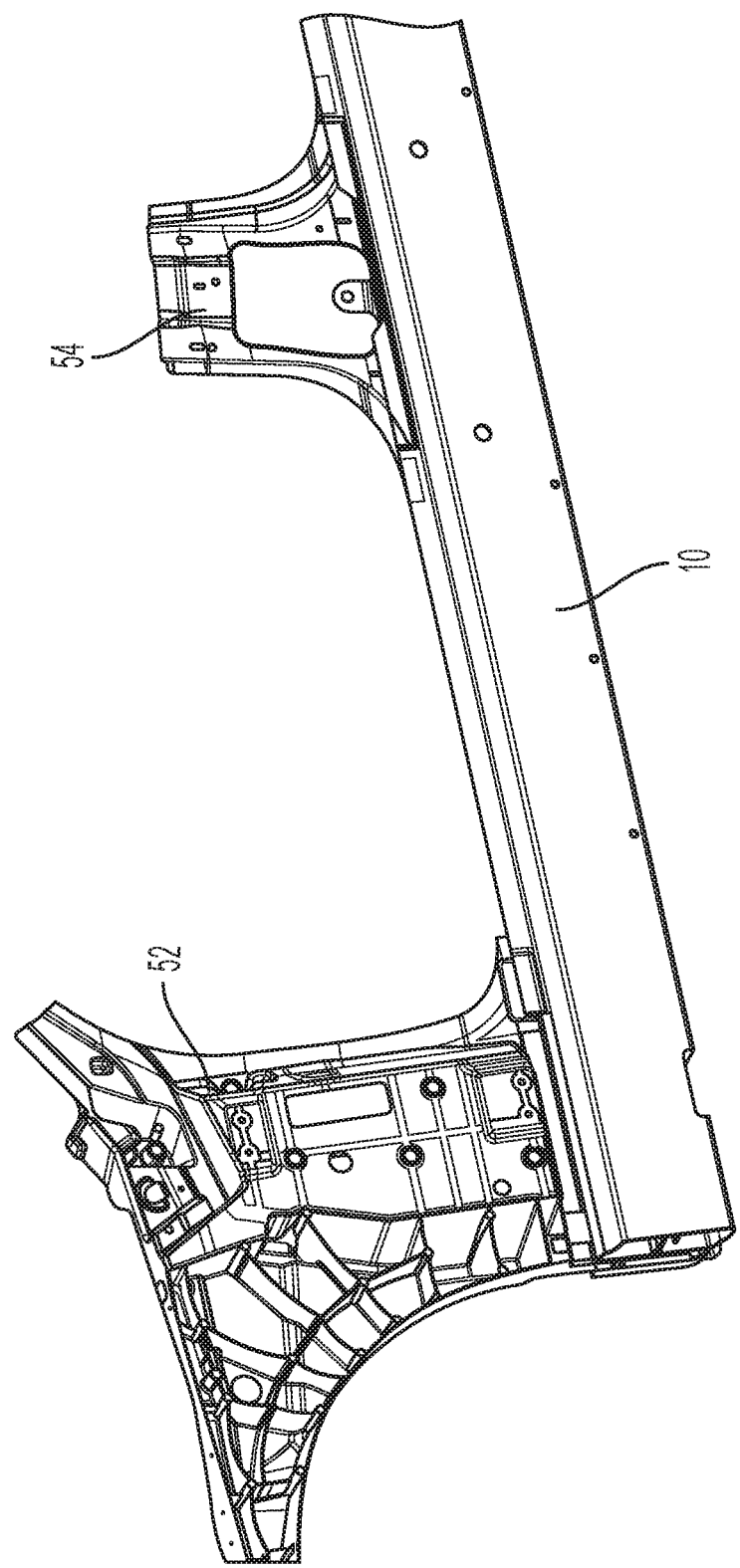
FIG. 3 is a schematic perspective view of the connection member of FIG. 1 coupled to a plurality of vehicle components, according to an embodiment.

FIG. 3 schematically illustrates the connection member 10 coupling together two components 52 and 54 in an exemplary method of coupling vehicle components. In various embodiments, the components 52, 54 are vehicle body components. The position and length of each flange of the connection member 10 can be customized depending on the intended configuration of the coupled components. As shown in FIG. 3, the tubular connection member 10 defines a longitudinal axis and has a first side, a second side opposite the first side, a third side connecting the first and second sides, and a fourth side connecting the first and second sides. The third side includes a first portion defining a first plane, a second portion defining a second plane, and a third portion defining a third plane. The third side also includes a first edge and a second edge, the first edge separating the first plane from the second plane and the second edge separating the second plane from the third plane. The first vehicle body component 52 is coupled to the first flange and the second vehicle body component 54 is coupled to the second flange such that the first and second vehicle body components are laterally spaced from each other.

While FIG. 3 illustrates two components coupled to the connection member 10, it is understood that three, four, or more components may be coupled to the first, second, third, or more flanges of the connection member 10, depending on the length and position of the flanges.

While FIGS. 1-3 illustrate a connection member 10 having a three-flange configuration, it is understood that other embodiments may include more or fewer flanges arranged on the connection member 10 to accommodate and couple a multitude of components.

In various embodiments, the connection member 10, including each of the flanges, is formed as an extrusion. The flanges can be machined or otherwise cutaway to produce the desired length and configuration of flange(s). In various embodiments, the connection member 10 may also be formed via any other manufacturing method such as casting, 3D printing, welding, etc. as known to those skilled in the art.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system for coupling multiple components, the system comprising:
    a generally tubular connection member defining a longitudinal axis, the connection member having a first side, a second side opposite the first side, a third side connecting the first and second sides, and a fourth side connecting the first and second sides, the third side including a first portion defining a first plane, a second portion defining a second plane, and a third portion defining a third plane, the third side also including a first edge and a second edge; and a first flange having a free end and extending from the first edge at a second end and a second flange having a free end and extending from the second edge at a second end;

wherein the first flange includes a first flange portion and a second flange portion separated by a first gap and the second flange includes a third flange portion and a fourth flange portion separated by a second gap;

wherein the first edge is separated from the first side by the first portion, the second edge is separated from the second side by the third portion, and the first edge is separated from the second edge by the second portion; and wherein the fourth side is separated from the third side by the first and second sides.

2. The system of claim 1, wherein a lateral axis of the connection member passes through the first and second sides and the first flange and the second flange are parallel to the longitudinal axis and laterally spaced from one another.

3. The system of claim 1, wherein the second portion separates the first flange from the second flange.

4. The system of claim 1, wherein the first portion forms a first angle with the first flange and the third portion forms a second angle with the second flange and the first and second angles are different.

5. The system of claim 1, wherein the connection member further comprises a support member connecting an interior surface of the first side with an interior surface of the second side.

6. The system of claim 1, wherein the second gap is larger than the first gap.

7. The system of claim 1, wherein the first and second flanges at least partially overlap.

8. The system of claim 1, wherein the first and second flanges do not overlap.

9. The system of claim 1, wherein the first flange portion is spaced apart from the second flange portion along a first direction defined by the first edge to define the first gap and the third flange portion is spaced apart from the fourth flange portion along a second direction defined by the second edge to define the second gap.

10. A tubular member, comprising:
a first side;
a second side opposite the first side;
a third side connecting the first and second sides, the third side including a first portion defining a first plane, a second portion defining a second plane, and a third portion defining a third plane, the third side also including a first edge separating the first plane from the second plane and a second edge separating the second plane from the third plane;
a first flange having a free end and extending along the first edge at a second end; and
a second flange having a free end and extending along the second edge at a second end such that the first and second flanges are separated by the second portion;

wherein the first, second, and third planes are non-coplanar; and wherein the first flange includes a first flange portion and a second flange portion separated by a first gap and the second flange includes a third flange portion and a fourth flange portion separated by a second gap.

11. The tubular member of claim 10, wherein the tubular member defines a longitudinal axis and the first flange and the second flange are parallel to the longitudinal axis.

12. The tubular member of claim 10, wherein the first portion forms a first angle with the first flange and the third portion forms a second angle with the second flange and the first and second angles are different.

13. The tubular member of claim 10 further comprising a support member connecting an interior surface of the first side with an interior surface of the second side.

14. The tubular member of claim 10, wherein the second gap is larger than the first gap.

15. The tubular member of claim 10, wherein the first and second flanges at least partially overlap.

16. The tubular member of claim 10, wherein the first and second flanges do not overlap.

17. The tubular member of claim 10, wherein the first flange portion is spaced apart from the second flange portion along a first direction defined by the first edge to define the first gap and the third flange portion is spaced apart from the fourth flange portion along a second direction defined by the second edge to define the second gap.

18. A method for coupling vehicle body components, comprising:
providing a tubular connection member, the connection member defining a longitudinal axis and having a first side, a second side opposite the first side, a third side connecting the first and second sides, and a fourth side connecting the first and second sides, the third side including a first portion defining a first plane, a second portion defining a second plane, and a third portion defining a third plane, the third side also including a first edge and a second edge, the first edge separating the first plane from the second plane and the second edge separating the second plane from the third plane, the connection member also including a first flange extending from the first edge and a second flange extending from the second edge, wherein the first flange includes a first flange portion and a second flange portion separated by a first gap and the second flange includes a third flange portion and a fourth flange portion separated by a second gap;
providing a first vehicle body component and coupling the first vehicle body component to the first flange; and
providing a second vehicle body component and coupling the second vehicle body component to the second flange such that the first and second vehicle body components are laterally spaced from each other.

19. The method of claim 18, wherein the method includes coupling the first vehicle body component to the first flange portion, providing a third vehicle body component, and coupling the third vehicle body component to the second flange portion such that the first and third vehicle body components are longitudinally and laterally spaced from each other.

* * * * *